(12) United States Patent
Potteau et al.

(10) Patent No.: US 8,720,422 B2
(45) Date of Patent: May 13, 2014

(54) INTERNAL COMBUSTION HEAT ENGINE, CONTROL SYSTEM, METHOD FOR DIMENSIONING THE ENGINE, AND AUTOMOBILE WITH SAID ENGINE

(75) Inventors: Sebastien Potteau, Triel sur Seine (FR); Philippe Lutz, Le Vesinet (FR); Damien Fournigault, Conflans-Sainte-Honorine (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 366 days.

(21) Appl. No.: 13/130,119

(22) PCT Filed: Dec. 18, 2009

(86) PCT No.: PCT/FR2009/001450
§ 371 (c)(1),
(2), (4) Date: May 19, 2011

(87) PCT Pub. No.: WO2010/076430
PCT Pub. Date: Jul. 8, 2010

(65) Prior Publication Data
US 2011/0226223 A1   Sep. 22, 2011

(30) Foreign Application Priority Data
Dec. 18, 2008   (FR) ...................................... 08 07134

(51) Int. Cl.
*F02D 41/00*   (2006.01)
*F02M 25/07*   (2006.01)

(52) U.S. Cl.
USPC ................. 123/568.21; 123/1 A; 123/525

(58) Field of Classification Search
CPC .......... F02D 19/10; F02D 41/00; F02M 1/00; F02M 31/16; F02M 31/18
USPC ............. 123/568.11, 568.12, 568.15, 568.17, 123/568.2, 568.21, 568.26, 568.27, 1 A, 123/27 GE, 555–557, 575–577, 585, 559.1; 701/108; 60/605.1, 605.2
See application file for complete search history.

(56) References Cited

U.S. PATENT DOCUMENTS 7,356,403 B2 *   4/2008   Yoshioka et al. ............. 701/108
2001/0045090 A1 *  11/2001   Gray, Jr. ......................... 60/278
(Continued)

FOREIGN PATENT DOCUMENTS

EP   1 559 893 A1   8/2005
EP   1 754 874 A1   2/2007

OTHER PUBLICATIONS

International Search Report w/translation from PCT/FR2009/001450 dated Apr. 12, 2010 (4 pages).

*Primary Examiner* — John Kwon
*Assistant Examiner* — Johnny Hoang
(74) *Attorney, Agent, or Firm* — Osha Liang LLP

(57) ABSTRACT

The invention relates to an internal combustion heat engine, with at least one combustion chamber for intake gases comprising a mixture consisting of a fuel such as petrol and an oxidizer such as air, connected to an intake circuit (A) for the intake of said intake gases into the chamber and an exhaust circuit (B) for the exhaust of the burnt gases outside the chamber, an exhaust gas recirculation circuit (C, D) connecting the exhaust circuit to the intake circuit, and a control system for the exhaust gas recirculation. The control system is arranged so that the exhaust gas recirculation is implemented for at least one operation point defined by an engine speed and a torque output by the engine, for which the output torque is higher than 50% of the maximum engine torque. The invention can be used for operating the engine with optimal stoichiometric mixture and ignition advance without the occurrence of rattling.

9 Claims, 2 Drawing Sheets

(56) References Cited

U.S. PATENT DOCUMENTS

| | | | |
|---|---|---|---|
| 2004/0055282 A1* | 3/2004 | Gray et al. | 60/278 |
| 2004/0065274 A1 | 4/2004 | Cohn et al. | |
| 2007/0039598 A1* | 2/2007 | Wakayama et al. | 123/568.21 |
| 2009/0192693 A1* | 7/2009 | Bottcher et al. | 701/102 |
| 2010/0250103 A1* | 9/2010 | Shimo et al. | 701/108 |

* cited by examiner

INTERNAL COMBUSTION HEAT ENGINE, CONTROL SYSTEM, METHOD FOR DIMENSIONING THE ENGINE, AND AUTOMOBILE WITH SAID ENGINE

The field of the present invention is that of internal combustion engines, and more particularly gasoline engines, preferably supercharged.

An internal combustion engine for a motor vehicle comprises a combustion chamber, generally formed of one or more cylinders, in which a mixture of fuel and air is burnt to generate engine work. The intake mixture may or may not be compressed, depending on whether or not the engine comprises a supercharger compressor.

Mounted so that they can move in the cylinders are pistons which drive a crankshaft which rotates as one with a shaft. As is well known to those skilled in the art, the speed of an engine is defined as being the number of revolutions of the engine shaft at a given instant; moreover, the torque supplied by the engine is defined as being the moment of the torque measured on the engine shaft.

In the case of a supercharged engine which comprises compression means such as a compressor or a turbocompressor, the mixture is aspirated by the engine, compressed by the compressor, admitted into the cylinders where it is burnt and then removed by the exhaust circuit. When the compression means comprise a turbocompressor, the exhaust gases drive a turbine which is mechanically secured to the compressor so as to drive the latter.

It is also known that most internal combustion engines, especially diesel engines and direct-injection gasoline engines, produce oxides of nitrogen, generally denoted NOx, which have particularly harmful effects on the environment. One known means for limiting the production of oxides of nitrogen is to recirculate some of the exhaust gases and inject them into the intake side of the engine. This is what is known as exhaust gas recirculation, commonly known by its English-language acronym EGR. The reduction in NOx achieved by recirculating exhaust gases is the result of a drop in temperature in the combustion chamber, because the heat capacity of the exhaust gases (made up chiefly of CO2 and water vapor) is around 20% higher than that of the fresh gases (the expression "fresh gases" denotes the gaseous mixture aspirated into the engine prior to the reinjection of the recirculated exhaust gases; the fresh gases are therefore generally formed of air and gasoline vapors; the fresh gases mixed with the recirculated exhaust gases constitute the intake gases). The exhaust gases are generally cooled in a heat exchanger before they are reintroduced in the combustion chamber.

This EGR technique is essentially implemented at low speed (typically below 2 to 3000 rpm, namely about three times the low idle speed) and light load (which can be characterized by a torque smaller by half than the maximum torque that the engine is capable of delivering), in order to avoid NOx emissions when the vehicle is being used on an urban cycle. It also has an additional benefit in that it affords a reduction in fuel consumption at these low speed and light load operating points. Because of the reinjected gases, the pressure of the intake gases is around one atmosphere, whereas it is below that (0.7 or 0.8 atm) for the same mass of fresh gases aspirated if the engine aspirates only fresh gases; it therefore follows that the engine supplies less work to aspirate the gases and therefore consumes less fuel.

The exhaust gas recirculation may be termed "low pressure" when performed on exhaust gases tapped off after the turbine and reintroduced before the compressor, or "high pressure" when performed on gases tapped off before the turbine and reintroduced after the compressor.

The recirculation, whether this be low-pressure or high-pressure recirculation, is controlled by ad hoc means such as a three-way valve for example, and control over this valve by the engine control unit.

Motor vehicle manufacturers are constantly seeking to reduce the fuel consumption of their engines and to meet increasingly tight pollutant emissions, such as NOx emissions, standards. One of the paths being explored is the improvement in supercharged gasoline engines so that these can become competitive with diesel engines in terms of fuel consumption. The compression of the gases combined with supercharging indeed results in a reduction in the volume of the engine and in a corresponding reduction in friction losses.

One of the problems encountered with supercharged gasoline engines is their susceptibility to the phenomenon of pinging, which prevents them from best realizing their performance, which is optimized with an air/fuel mixture used under stoichiometric conditions (typically 14 g of air for 1 g of fuel). Pinging is a phenomenon of abnormal combustion in controlled-ignition engines, which is noticeable from outside by a metallic noise emanating from the engine and may be destructive to the pistons of the engine. It is the result of shock waves in the combustion chamber, which shock waves are initiated by self-ignition of as yet unburnt gases. Increasing the compression ratio (that is to say the ratio of the volume of the combustion chamber when the piston is at bottom dead center to its volume when the piston is at top dead center) in fact aggravates the pinging phenomenon. Whereas with a naturally aspirated engine, that is to say one that is not supercharged, compression ratios of the order of 11 can commonly be achieved, supercharged engines are, at the present time, in practice limited to ratios of the order of 9.

Various solutions for countering the onset of pinging and allowing the compression ratio to be increased have been imagined. For example, it has been proposed for the ignition advance to be backed off, that is to say that the idea has been to retard the moment at which the air-fuel mixture is ignited after the piston passes through top dead center or, in other words, after the gases have reached their maximum pressure. An increase in the richness of the mixture has also been proposed by injecting more fuel than would be required for stoichiometric conditions, the excess fuel absorbing the energy that could lead to the pinging (the richness means the ratio between the amount of fuel injected and the amount of fuel that corresponds to a stoichiometric mixture (of stoichiometry, the richness is therefore equal to 1)).

These solutions result in a non-optimal use of the injected fuel and therefore result in excessive fuel consumption.

It is an object of the present invention to address these disadvantages by proposing an improved operation for gasoline engines, notably for supercharged engines with high compression ratios. The invention aims to allow these engines to operate at any speed without pinging, using a mixture under stoichiometric conditions which is ignited with an optimal advance with respect to the point of passage of the piston through top dead center.

To this end, the subject of the invention is an internal combustion engine with at least one combustion chamber for intake gases comprising a mixture consisting of a fuel such as gasoline and an oxidant such as air, connected to an intake circuit for admitting said intake gases into the chamber and to an exhaust circuit for exhausting the burnt gases from the chamber, an exhaust gas recirculation (EGR) circuit connecting the exhaust circuit to the intake circuit and a system for controlling the recirculation of the exhaust gases, characterized in that the control system is designed so that the recirculation of the exhaust gases is carried out for at least one operating point, defined by an engine speed and a torque supplied by the engine, for which point the torque delivered is more than 50% of the maximum engine torque.

Recirculating the exhaust gases at high loads (that is to say at high torque) makes it possible to avoid the pinging phenomenon. It is then possible to get the best out of the engine and operate it under conditions that are optimal in terms of fuel consumption.

For any engine, an operating diagram is defined, which relates the torque supplied by the engine to the speed at which the engine is turning; each speed is associated with a maximum torque that the engine is able to deliver. The curve relating the maximum torques to the various speeds has a maximum, which is known by the name of maximum engine torque; this maximum torque is delivered at a particular speed, known as the maximum torque speed.

In a preferred embodiment, the control system is designed so that the recirculation of the exhaust gases is performed at speeds higher than three times the low idle speed of the engine. The pinging phenomenon is negligible below this speed. The low idle speed is defined, in the conventional way, as being a low engine speed (around about 1000 rpm depending on the engine) that is intended to keep the engine running without the need to operate the accelerator.

For preference, the mixture of fuel and oxidant is, for said operating point, metered substantially to the stoichiometric proportions and, preferably, ignited at an instant substantially corresponding to the optimal ignition advance conditions. The best possible engine performance is thus obtained in terms of torque at any speed, and is so for a minimal fuel consumption. As is well known to those skilled in the art, the ignition advance is defined as being the angle made by the crankshaft, at the time of ignition of the mixture (for example by operating a spark plug in the cylinder) with respect to the position it will have at top dead center, that is to say at the moment when the volume of the cylinder available for the mixture is at its minimum. The optimum ignition advance conditions correspond to a setting of the ignition advance which, depending on speed, makes it possible to obtain the maximum torque at the speed concerned.

According to one particular embodiment, the combustion engine is a supercharged engine, which works by compressing the intake gases. Reinjecting exhaust gases is all the more beneficial to supercharged engines because they are particularly sensitive to the pinging phenomenon.

For preference, with the engine operation being parametrized by a combustion chamber compression ratio and an exhaust gas recirculation ratio, the control system is designed so that the recirculation ratio at said operating point, expressed as a percentage by mass, is equal to three times the engine compression ratio, decreased by 13, with a tolerance of 2. The EGR ratio is defined as the ratio between the mass of reinjected exhaust gases entering the intake circuit per unit time and the total mass of gases entering the combustion chamber per unit time. The applicant company has taken the trouble to research whether there is a relationship between the optimum EGR ratio at high load and the compression ratio; it found that such a relationship does exist and that this EGR ratio guarantees optimum engine operation in terms of fuel consumption, without pinging, in its range of operation at high load (supplied torque greater than 50% of the maximum torque).

For preference, the control system is designed so that the EGR ratio is equal, for an operating point at which the torque delivered is less than 50% of the maximum engine torque, to three times the engine compression ratio, decreased by 13, with a tolerance of 5. At light load, the EGR ratio can thus be chosen from a wider range of values, without the risk of pinging, and can be optimized in order to reduce fuel consumption.

The invention also relates to a control system for controlling the recirculation of the exhaust gases for the engine defined hereinabove, comprising at least one exhaust gas recirculation control valve and a control module controlling said valve.

The invention also relates to a method of dimensioning the exhaust gas recirculation circuit of the engine defined hereinabove, characterized in that the recirculation ratio taken into consideration when dimensioning the EGR circuit is, expressed as a percentage by mass, equal to three times the engine compression ratio, reduced by 13, with a tolerance of 2.

The invention further relates to a method for defining a control law for controlling the exhaust gas recirculation of the engine defined hereinabove, in which an exhaust gas recirculation is defined for operating points for which the delivered torque is greater than 50% of the maximum engine torque. Thanks to this method, the engine control can be defined with assurance that pinging will not be encountered and that optimum engine operation will be available in terms of fuel consumption.

Another subject of the invention is a vehicle propelled by an internal combustion engine having the features of the engine defined hereinabove.

The invention will be better understood, and other objects, details, features and advantages thereof will become more clearly apparent during the detailed explanatory description which follows of one embodiment of the invention which is given purely by way of illustrative and unlimiting example with reference to the attached schematic drawings.

Figure 1:
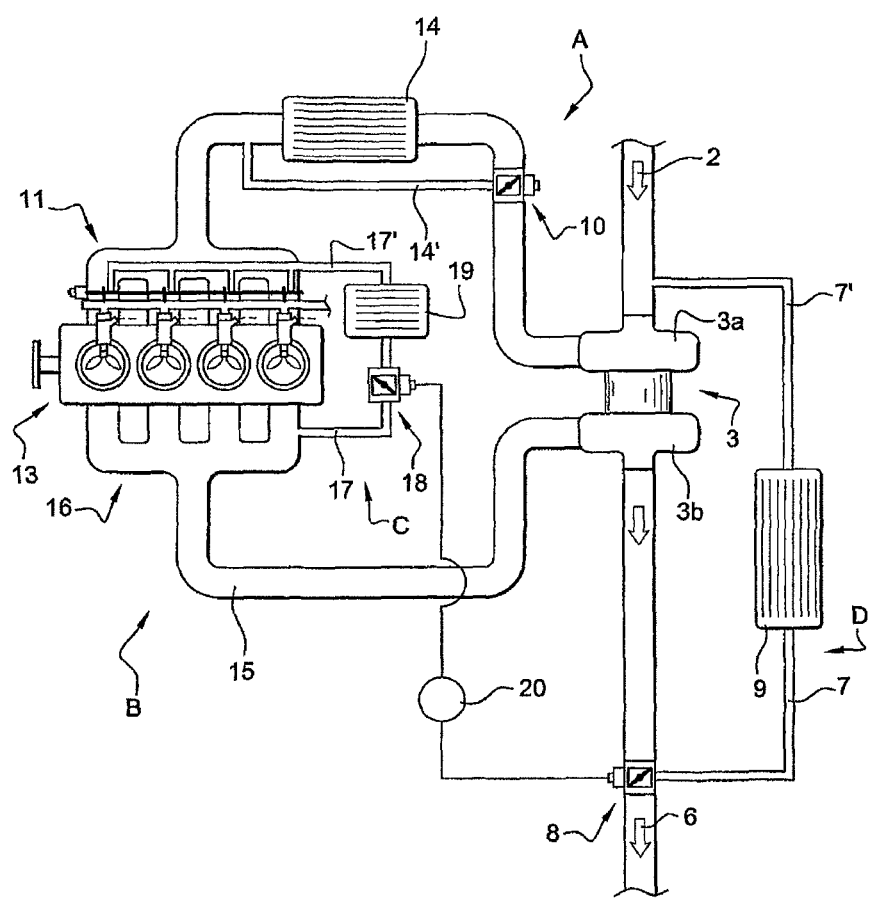
FIG. 1 is a schematic view of a supercharged engine with two exhaust gas recirculation devices, a high-pressure one and a low-pressure one.

Reference is made to FIG. 1 which shows a supercharged engine 13 comprising four cylinders—all forming a combustion chamber—supplied with intake gas by an intake circuit A attached to the engine by an intake pipe 11 and connected to an exhaust circuit B for exhausting the burnt gases notably comprising an exhaust gas manifold 16. The fresh gases are conveyed to the engine by an intake duct 2, then compressed by the compressor 3a of a turbocompressor 3 and sent to the intake pipe 11; the compressor 3a is mechanically connected to a turbine 3b. The exhaust gases, leaving the exhaust manifold 16, are driven, via an exhaust duct 15, toward the turbine 3b of the turbocompressor 3 where they are expanded to supply the power necessary to drive the compressor 3a. They can then either be discharged through the exhaust pipe of the vehicle via a duct 6 or be recirculated.

Two independent exhaust gas recirculation (EGR) devices are provided: a high-pressure EGR device C and a low-pressure EGR device D. The invention applies to either one of these devices C, D used alone, or to both devices used jointly.

The high-pressure device C comprises a first bypass duct 17 tapping off exhaust gases from the exhaust gas manifold 16. A first control valve 18 is mounted in this duct 17 and is connected to a first heat exchanger 19. When the exhaust gases follow the first duct 17, the control valve 18 and the first exchanger 19, they are reinjected into the intake pipe 11 via a reinjection duct 17'.

The low-pressure device D comprises a second bypass duct 7 tapping exhaust gases off downstream of the turbine 3b of the turbocompressor 3. A second control valve 8 is mounted in this duct and is connected to a second heat exchanger 9. When the exhaust gases follow the second duct 7, the control valve 8 and the second exchanger 9, they are reinjected, via a reinjection duct 7', into the intake duct 2 upstream of the compressor 3a of the turbocompressor 3.

The control valves 8, 18 are designed to control the EGR ratio. To do that they are connected to an EGR ratio control system 20 which controls the control valves 8, 18 in such a way as to tap off greater or lesser amounts of exhaust gas from the exhaust circuit B. The control system 20 may notably comprise a microcontroller, as is conventional.

A device for controlling the temperature of the intake gases (that is to say the combination of fresh gases and reinjected exhaust gases) is also provided and notably comprises a third control valve 10 which directs the intake gases toward a third heat exchanger that can be used to cool them or into a line 14' bypassing the exchanger 14 and guiding the gases directly to the intake pipe 11; the gases may, in full or in part, follow one of the routes or the other.

Figure 2:
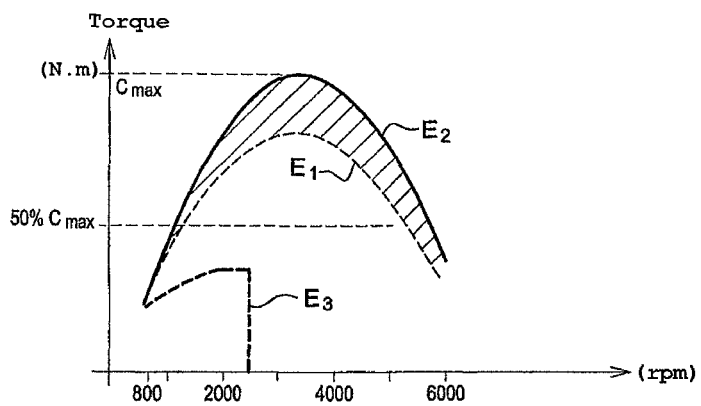
FIG. 2 is a graph giving the position of the operating point of an internal combustion engine in a speed-torque diagram.

FIG. 2 depicts an operating diagram showing torque (in N.m) as a function of the rotation speed N (in revolutions per minute (rpm)) for a supercharged engine, well known to those skilled in the art. The "engine operating point" is defined as being, at a given instant, the point on this diagram defined by the engine speed N and the torque C that it provides. The engine operating point at any instant lies in a position which indicates the engine load, which can be derived from the ratio between the torque supplied by the engine turning over at a given engine speed and the maximum torque it is capable of delivering at this speed.

The curve $E_1$ defines the maximum torque, as a function of speed, that could be obtained in the prior art while avoiding the onset of pinging, either by backing off the ignition advance or by enriching the mixture beyond stoichiometric conditions, as explained above. The curve $E_2$ defines the maximum torque that the engine is able to deliver, under nominal conditions, if the pinging phenomenon did not exist and if there were no need to prevent its onset. The hatched region between these two curves $E_1$, $E_2$ therefore represents the region of operation that is forbidden in the prior art, because of the pinging. The region delimited by the curve $E_3$ corresponds to the operating points (essentially below three times the low idle speed and at a part load less than 50%) for which exhaust gas recirculation was employed in the prior art. Note that the "maximum engine torque" $C_{max}$ is defined as being the highest point on the curve $E_2$, that is to say the highest torque that the engine is able to provide, taking all engine speeds into consideration.

Figure 3:
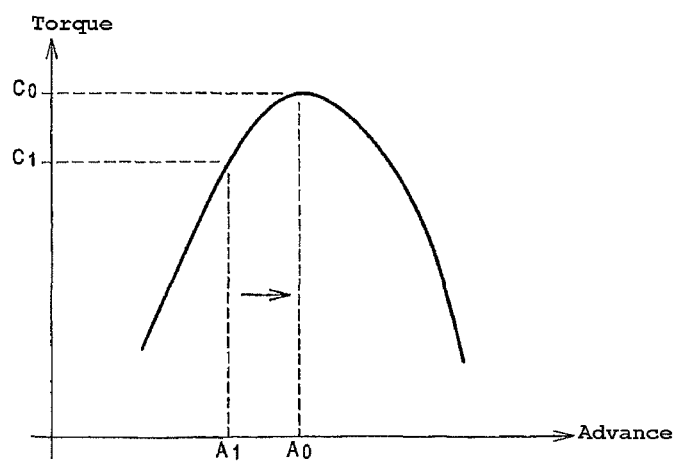
FIG. 3 is a graph giving the change of torque of an internal combustion engine, at a given engine speed, as a function of its ignition advance.

FIG. 3 represents the torque delivered by an engine at a given speed as a function of the ignition advance applied to it, the engine being supplied with a mixture of fuel and of oxidant in stoichiometric proportions. With no reinjection of exhaust gases, the advance can be increased to a value $A_1$, beyond which the pinging phenomenon occurs. The torque delivered increases with ignition advance up to a value $C_1$, obtained with the advance $A_1$, which is lower than the maximum torque $C_0$ that the engine would be able to deliver if the pinging did not exist. This value would be obtained for an advance $A_0$ greater than $A_1$.

According to the invention, exhaust gas recirculation is performed for engine operation points corresponding to a torque greater than 50% of the maximum engine torque, that is to say greater than $0.5 \cdot C_{max}$, or in other words at an engine load greater than 0.5.

Such exhaust gas recirculation makes it possible, at any engine speed, to obtain a pinging-free operation for a maximum torque $C_0$ at this speed, with an ignition advance equal to $A_0$, without enriching the mixture, that is to say using a mixture created in stoichiometric proportions between the gasoline and the air.

In other words, after studying various supercharged gasoline engine operating scenarios, it has been found that it is possible to eliminate pinging at high load, without degrading the operation of the engine in terms of advance or richness. This result is obtained by reinjecting exhaust gases throughout the engine operating range, that is to say even at loads corresponding to a torque greater than 50% of the maximum torque that the engine is capable of delivering.

According to one embodiment, an increase in the cooling of the EGR gases is associated with this mode of operation, in order to compensate for the additional heat supplied, at high speed, by these exhaust gases.

It has also been possible to establish a simple relationship between the EGR ratio that needs to be reinjected at any engine speed (this ratio being measured as the percentage, per unit time, of the mass of reinjected exhaust gases to the total mass of intake gases) and the engine compression ratio.

The optimum EGR ratio ($T_{EGR}$) is thus connected with the engine compression ratio ($T_C$) through the following relationship:

$$T_{EGR} = 3 \cdot T_C - 13$$

By way of example, with a compression ratio of 9, the maximum torque can be obtained at any speed, with no degradation of the advance and no enrichment of the mixture, using an EGR ratio of between 14 and 15%. For an engine with a compression ratio of 11, the optimum EGR ratio is 20%.

This relationship makes it possible, amongst others, for engine designers to dimension the exhaust gas reinjection circuit in advance, on the basis of the chosen compression ratio, without having to carry out lengthy development work on the test bed. This dimensioning relates to the size of the exhaust gas branch ducts 7, 17 and ducts 7', 17' that reinject the exhaust gases into the intake side and relates to the definition of the control law, used by the control system 20, for the associated control valve 8 or 18.

It is quite clear that these values can be approximated without the engine operating very far from its optimum, that is to say without any significant pinging. As a general rule, it is held that the result of the above relationship remains valid for an approximation of give or take 2. Thus, for example, in the case of an engine with a compression ratio of 8, the optimum EGR ratio for reinjection ought thus to range between 9 and 13%, the optimum still being equal to 11.

For engine operating points corresponding to a torque below 50% of the maximum torque $C_{max}$ that the engine is capable of delivering, exhaust gas recirculation can be reviewed downward because the requirements are different; specifically, pinging is absent and exhaust gas recirculation is used first and foremost to reduce gasoline consumption. Thus, the relationship between the EGR ratio $T_{EGR}$ and the compression ratio $T_C$ can, for these operating points, be written as:

$$T_{EGR} = 3 \cdot T_C - 13, \text{ with a tolerance of 5.}$$

The invention has been described for the case of supercharged engines because it provides a specially effective solution to their problem of pinging, to which they are particularly sensitive. However, it could equally be applied to naturally aspirated engines, with similar benefits.

Although the invention has been described in conjunction with a number of particular embodiments, it is quite clear that it is not in any way restricted thereto and that it encompasses all technical equivalents of the means described and combinations thereof where these fall within the scope of the invention.

The invention claimed is:

1. An internal combustion engine comprising:
   at least one combustion chamber for intake gases comprising a mixture of a fuel and an oxidant;
   an intake circuit operatively connected to the at least one combustion chamber for admitting said intake gases into the chamber;
   an exhaust circuit operatively connected to the at least one combustion chamber for exhausting burnt gases from the chamber;
   an exhaust gas recirculation circuit connecting the exhaust circuit to the intake circuit; and
   a control system for controlling the recirculation of the exhaust gases, wherein the control system carries out the recirculation of the exhaust gases for at least one operating point, defined by an engine speed and a torque supplied by the engine, and wherein the torque delivered for the at least one operating point is more than 50% of a maximum engine torque, wherein
   with the engine operation being parametrized by a combustion chamber compression ratio and an exhaust gas recirculation ratio, the control system is designed so that the recirculation ratio at said operating point, expressed as a percentage by mass, is equal to three times the engine compression ratio, decreased by 13, with a tolerance of 2.

2. The combustion engine as claimed in claim 1, in which the control system performs the recirculation of the exhaust gases at speeds higher than three times the low idle speed of the engine.

3. The combustion engine as claimed in claim 1, in which the mixture of fuel and oxidant is, for said at least one operating point, metered to the stoichiometric proportions and ignited at an instant corresponding to optimal ignition advance conditions.

4. The combustion engine as claimed in claim 1, which is supercharged by compressing the intake gases.

5. The combustion engine as claimed in claim 1, in which the control system is designed so that the recirculation ratio is equal, for the at least one operating point at which the torque delivered is less than 50% of the maximum engine torque, to three times the engine compression ratio, decreased by 13, with a tolerance of 5.

6. A control system for controlling recirculation of exhaust gases for an engine, comprising:
   at least one exhaust gas recirculation control valve; and
   a control module controlling said valve, wherein the engine comprises:
      at least one combustion chamber for intake gases comprising a mixture of a fuel and an oxidant;
      an intake circuit operatively connected to the at least one combustion chamber for admitting said intake gases into the chamber;
      an exhaust circuit operatively connected to the at least one combustion chamber for exhausting burnt gases from the chamber;
      an exhaust gas recirculation circuit connecting the exhaust circuit to the intake circuit; and
      a control system for controlling the recirculation of the exhaust gases, wherein the control system carries out the recirculation of the exhaust gases for at least one operating point, defined by an engine speed and a torque supplied by the engine, for which at least one operating point the torque delivered is more than 50% of a maximum engine torque, wherein
      with the engine operation being parametrized by a combustion chamber compression ratio and an exhaust gas recirculation ratio, the control system is designed so that the recirculation ratio at said operating point, expressed as a percentage by mass, is equal to three times the engine compression ratio, decreased by 13, with a tolerance of 2.

7. A method of dimensioning exhaust gas recirculation circuit of an engine, the method comprising:
   dimensioning the EGR circuit using a recirculation ratio, expressed as a percentage by mass, that is equal to three times the engine compression ratio, reduced by 13, with a tolerance of 2, wherein the engine comprises:
      at least one combustion chamber for intake gases comprising a mixture of a fuel and an oxidant;
      an intake circuit operatively connected to the at least one combustion chamber for admitting said intake gases into the chamber;
      an exhaust circuit operatively connected to the at least one combustion chamber for exhausting burnt gases from the chamber;
      an exhaust gas recirculation circuit connecting the exhaust circuit to the intake circuit; and
      a control system for controlling the recirculation of the exhaust gases, wherein the control system carries out the recirculation of the exhaust gases for at least one operating point, defined by an engine speed and a torque supplied by the engine, for which at least one operating point the torque delivered is more than 50% of a maximum engine torque, wherein
      with the engine operation being parametrized by a combustion chamber compression ratio and an exhaust gas recirculation ratio, the control system is designed so that the recirculation ratio at said operating point, expressed as a percentage by mass, is equal to three times the engine compression ratio, decreased by 13, with a tolerance of 2.

8. A method for defining a control law for controlling exhaust gas recirculation of the engine, the method comprising:
   defining an exhaust gas recirculation for operating points for which a delivered torque is greater than 50% of a maximum engine torque, wherein the engine comprises:
      at least one combustion chamber for intake gases comprising a mixture of a fuel and an oxidant;
      an intake circuit operatively connected to the at least one combustion chamber for admitting said intake gases into the chamber;
      an exhaust circuit operatively connected to the at least one combustion chamber for exhausting burnt gases from the chamber;
      an exhaust gas recirculation circuit connecting the exhaust circuit to the intake circuit; and
      a control system for controlling the recirculation of the exhaust gases, wherein the control system carries out the recirculation of the exhaust gases for at least one operating point, defined by an engine speed and a torque supplied by the engine, for which at least one operating point the torque delivered is more than 50% of a maximum engine torque, wherein with the engine operation being parametrized by a combustion chamber compression ratio and an exhaust gas recirculation ratio, the control system is designed so that the recirculation ratio at said operating point, expressed as a percentage by mass, is equal to three times the engine compression ratio, decreased by 13, with a tolerance of 2.

9. A motor vehicle equipped with an engine, the engine comprising:
   at least one combustion chamber for intake gases comprising a mixture of a fuel and an oxidant;
   an intake circuit operatively connected to the at least one combustion chamber for admitting said intake gases into the chamber;
   an exhaust circuit operatively connected to the at least one combustion chamber for exhausting burnt gases from the chamber;
   an exhaust gas recirculation circuit connecting the exhaust circuit to the intake circuit; and
   a control system for controlling the recirculation of the exhaust gases, wherein the control system carries out the recirculation of the exhaust gases for at least one operating point, defined by an engine speed and a torque supplied by the engine, for which at least one operating point the torque delivered is more than 50% of a maximum engine torque, wherein
   with the engine operation being parametrized by a combustion chamber compression ratio and an exhaust gas recirculation ratio, the control system is designed so that the recirculation ratio at said operating point, expressed as a percentage by mass, is equal to three times the engine compression ratio, decreased by 13, with a tolerance of 2.

* * * * *